United States Patent
Dey et al.

(10) Patent No.: US 9,712,828 B2
(45) Date of Patent: Jul. 18, 2017

(54) FOREGROUND MOTION DETECTION IN COMPRESSED VIDEO DATA

(71) Applicant: INDIAN STATISTICAL INSTITUTE, Kolkata (IN)

(72) Inventors: Bhaskar Dey, West Bengal (IN); Malay Kumar Kundu, Kolkata (IN)

(73) Assignee: INDIAN STATISTICAL INSTITUTE, Kolkata (IN)

( * ) Notice: Subject to any disclaimer, the term of this patent is extended or adjusted under 35 U.S.C. 154(b) by 0 days.

(21) Appl. No.: 14/807,853

(22) Filed: Jul. 23, 2015

(65) Prior Publication Data

US 2016/0350934 A1 Dec. 1, 2016

(30) Foreign Application Priority Data

May 27, 2015 (IN) ................ 591KOL2015

(51) Int. Cl.
*G06K 9/48* (2006.01)
*H04N 19/174* (2014.01)
(Continued)

(52) U.S. Cl.
CPC ........... *H04N 19/174* (2014.11); *G06T 7/262* (2017.01); *H04N 19/44* (2014.11); *H04N 19/48* (2014.11); *G06T 2207/20021* (2013.01)

(58) Field of Classification Search
CPC ...... G06T 7/20; H04N 19/174; H04N 19/124; H04N 19/44; G06K 9/6215; G06K 9/52
See application file for complete search history.

(56) References Cited

U.S. PATENT DOCUMENTS

| 5,402,123 A | * | 3/1995 | Jung | .............. H03M 7/42 341/63 |
| 5,937,101 A | * | 8/1999 | Jeon | .............. H04N 19/527 358/426.04 |

(Continued)

FOREIGN PATENT DOCUMENTS

EP 2015252 B1 2/2010

OTHER PUBLICATIONS

"H.264 video compression standard—New possibilities within video surveillance," White paper, Axis Communications Inc., pp. 1-10 (Mar. 2008).

(Continued)

*Primary Examiner* — Chan Park
*Assistant Examiner* — Elisa Rice
(74) *Attorney, Agent, or Firm* — Turk IP Law, LLC

(57) ABSTRACT

Technologies are generally described to identify foreground motion detection in compressed video data. In some examples, a foreground motion detection module may determine transform-coefficient-magnitude sums and motion-vector-magnitude sums associated with block coding units (BCUs) in compressed video data without decompressing the video data. The foreground motion detection module may also determine a background mean and a background co-variance associated with the compressed video data. To determine whether the BCU(s) contain foreground motion, the foreground motion detection module may determine a statistic based on the transform-coefficient-magnitude sums, the motion-vector magnitude sums, the background mean, and the background co-variance and compare the statistic to a threshold.

18 Claims, 5 Drawing Sheets

(51) Int. Cl.
  H04N 19/44  (2014.01)
  G06T 7/262  (2017.01)
  H04N 19/48  (2014.01)

(56) References Cited

U.S. PATENT DOCUMENTS

| | | | | |
|---|---|---|---|---|
| 6,735,253 | B1* | 5/2004 | Chang | G11B 27/28 375/240.16 |
| 7,006,950 | B1* | 2/2006 | Greiffenhagen | G06T 7/0048 382/107 |
| 7,394,852 | B2 | 7/2008 | Chujoh et al. | |
| 7,860,344 | B1* | 12/2010 | Fitzpatrick | G06K 9/3241 345/419 |
| 2004/0223652 | A1 | 11/2004 | Cetin et al. | |
| 2010/0290710 | A1* | 11/2010 | Gagvani | G06T 7/2053 382/224 |
| 2012/0057640 | A1* | 3/2012 | Shi | H04N 19/52 375/240.26 |
| 2013/0243099 | A1* | 9/2013 | Feng | H04N 19/00533 375/240.24 |
| 2013/0278767 | A1 | 10/2013 | Bernal et al. | |
| 2014/0233792 | A1 | 8/2014 | Us et al. | |
| 2015/0281715 | A1* | 10/2015 | Lawrence | G06T 7/2006 375/240.16 |

OTHER PUBLICATIONS

Bouwmans, T., "Traditional and recent approaches in background modeling for foreground detection: An overview," Computer Science Review, vol. 11-12, pp. 31-66 (May 2014).

Chen, Y.M., et al., "Moving region segmentation from compressed video using global motion estimation and Markov random fields," IEEE Transactions on Multimedia, vol. 13, No. 3, pp. 421-431 (Mar. 17, 2011).

Dey, B., and Kundu, M.K., "Robust Background Subtraction for Network Surveillance in H.264 Streaming Video," IEEE Transactions on Circuits and Systems for Video Technology, vol. 23, No. 10), pp. 1695-1703 (Mar. 28, 2013).

Jain, A.K., "Fundamentals of Digital Image Processing". Englewood Cliffs, NJ: Prentice-Hall, pp. 138-140 (1989).

Kim, K., et al., "Real time foreground-background segmentation using codebook model" Real-Time Imaging archive, vol. 11, No. 3, Jun. 2005.

Lam E.Y., and Goodman, J.W., "A mathematical analysis of the DCT coefficient distributions for images," IEEE Transaction on Image Processing., vol. 9, No. 10, pp. 1661-1666 (Oct. 2000).

Poppe, C., et al., "Moving Object Detection in the H.264/AVC compressed domain for video surveillance applications," Journal of Visual Communication and Image Representation, vol. 20, No. 6, pp. 428-437 (Aug. 1, 2009).

Sullivan G.J., et al., "Overview of the High Efficiency Video Coding (HEVC) Standard," IEEE Transactions on Circuits and Systems for Video Technology, vol. 22, No. 12, Dec. 2012, pp. 1649-1668 (Sep. 28, 2012).

"changedetection.net," accessed at https://web.archive.org/web/20150424101448/http://changedetection.net/, accessed on Nov. 15, 2016, p. 1.

"Powerful video codec analyzer for professionals & researchers," accessed at https://web.archive.org/web/20150512202140/http://www.codecian.com/, accessed on Nov. 15, 2016, pp. 3.

International Search Report and Written Opinion for International Application No. PCT/IB2016/52344 mailed Sep. 2, 2016, pp. 8.

* cited by examiner

COMPUTER PROGRAM PRODUCT 500

SIGNAL-BEARING MEDIUM 502

504 AT LEAST ONE OF

ONE OR MORE INSTRUCTIONS TO SELECT AT LEAST ONE BCU FROM COMPRESSED VIDEO DATA;

ONE OR MORE INSTRUCTIONS TO DETERMINE, WITHOUT DECOMPRESSING THE SELECTED BCU(S), A TRANSFORM-COEFFICIENT-MAGNITUDE SUM AND A MOTION-VECTOR-MAGNITUDE SUM, BOTH ASSOCIATED WITH THE BCU(S);

ONE OR MORE INSTRUCTIONS TO DETERMINE A BACKGROUND MEAN AND A BACKGROUND CO-VARIANCE, BOTH ASSOCIATED WITH THE COMPRESSED VIDEO DATA;

ONE OR MORE INSTRUCTIONS TO DETERMINE A STATISTIC BASED ON THE TRANSFORM-COEFFICIENT-MAGNITUDE SUM, THE MOTION-VECTOR-MAGNITUDE SUM, THE BACKGROUND MEAN, AND THE BACKGROUND CO-VARIANCE; AND

ONE OR MORE INSTRUCTIONS TO COMPARE THE STATISTIC TO A THRESHOLD TO DETERMINE WHETHER THE BCU(S) CONTAIN FOREGROUND MOTION.

| COMPUTER-READABLE MEDIUM 506 | RECORDABLE MEDIUM 508 | COMMUNICATIONS MEDIUM 510 |
|---|---|---|

FIG. 5

FOREGROUND MOTION DETECTION IN COMPRESSED VIDEO DATA

CROSS-REFERENCE TO RELATED APPLICATION

This application claims priority under 35 U.S.C. §119(a) of India Application No. 591/KOL/2015 filed on May 27, 2015. The India Application is hereby incorporated by reference in its entirety.

BACKGROUND

Unless otherwise indicated herein, the materials described in this section are not prior art to the claims in this application and are not admitted to be prior art by inclusion in this section.

The automatic analysis of digital video sequences for surveillance applications may involve the segmentation of specific regions of interest or moving objects from a background scene. In many situations, the simple fact that something is moving may make it of interest, while other stationary features may be ignored. In these situations, moving objects may be categorized as the foreground and the remaining portion of the scene may be characterized as the background. In some cases, detecting the foreground may be as simple as subtracting a current image frame from a referenced background frame. However, the background may not be known beforehand, and may need to be determined and modeled. Moreover, in some situations, features in the background may also move, potentially further complicating the foreground detection.

SUMMARY

The present disclosure generally describes techniques to model backgrounds in compressed video data.

According to some examples, a system is provided to distinguish foreground motion from background motion in video data. The system may include a memory configured to store compressed video data and a processor block. The processor block may be configured to select, from the compressed video data, a block coding unit (BCU) that potentially contains foreground motion. The processor block may be further configured to determine, without decompression of the BCU, a statistic based on a transform-coefficient-magnitude sum of the BCU, a motion-vector-magnitude sum of the BCU, a background mean associated with the compressed video data, and/or a background co-variance associated with the compressed video data. The processor block may be further configured to determine, based on a comparison of the statistic to a threshold, whether the BCU contains the foreground motion.

According to other examples, a method is provided to identify foreground motion detection in compressed video data. The method may include selecting at least one block coding unit (BCU) from the compressed video data and determining a transform-coefficient-magnitude sum of the at least one BCU and a motion-vector magnitude sum of the at least one BCU without decompressing the at least one BCU. The method may further include determining a statistic based on the transform-coefficient-magnitude sum and the motion-vector-magnitude sum and comparing the statistic to a threshold. The method may further include determining that the at least one BCU contains the foreground motion in response to determination that the statistic is above the threshold and determining that the at least one BCU does not contain foreground motion in response to determination that the statistic is below the threshold.

According to further examples, a system is provided to identify foreground motion detection in compressed video data. The system may include a memory configured to store compressed video data and a processor block configured to select a block coding unit (BCU) that potentially contains foreground motion from the compressed video data. The processor block may be further configured to determine a transform-coefficient-magnitude sum of the BCU and a motion-vector-magnitude sum of the BCU without decompression of the BCU and determine that the BCU contains foreground motion based on the transform-coefficient-magnitude sum and the motion-vector-magnitude sum.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 5 illustrates a block diagram of an example computer program product, all arranged in accordance with at least some embodiments described herein.

DETAILED DESCRIPTION

Figure 1:
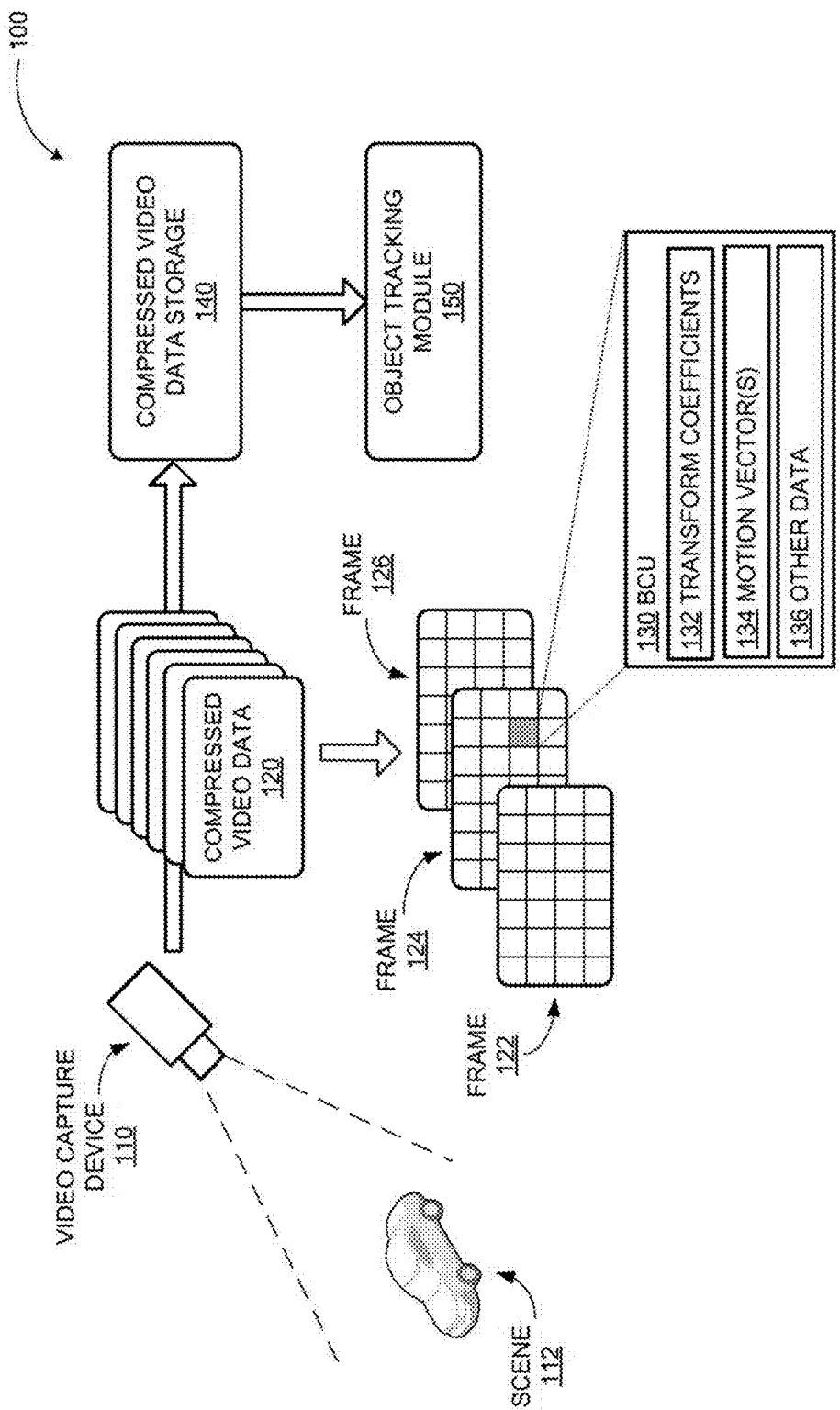
FIG. 1 illustrates an example surveillance system where foreground motion detection in compressed video data may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to identification of foreground motion detection in compressed video data.

Briefly stated, technologies are generally described to identify foreground motion detection in compressed video data. In some examples, a foreground motion detection module may determine transform-coefficient-magnitude sums and motion-vector-magnitude sums associated with block coding unit (BCUs) in compressed video data without decompressing the video data. The foreground motion detection module may also determine a background mean and a background co-variance associated with the compressed video data. To determine whether one or more BCUs contain foreground motion, the foreground motion detection module may determine a statistic based on the transform-coefficient-magnitude sums, the motion-vector magnitude sums, the background mean, and the background co-variance and compare the statistic to a threshold.

FIG. 1 illustrates an example surveillance system 100 where foreground motion detection in compressed video data may be implemented, arranged in accordance with at least some embodiments described herein.

The surveillance system 100 may include a video capture device 110 configured to record video associated with a scene 112. In some embodiments, the video capture device 110 may form compressed video data 120 using a compression module that implements an algorithm or standard such as Moving Picture Experts Group (MPEG)-2 Part 2, MPEG-4 Part 2, H.264, High Efficiency Video Coding (HEVC), Theora, Dirac, RealVideo RV40, VP8, VP9, or any other suitable video compression standard.

The compressed video data 120 may include a number of sequential frames 122, 124, 126, where each frame may represent image data at a particular time. A frame such as the frame 124 may be divided into one or more block coding units (BCUs). A BCU is a fundamental unit and is also known as macroblock in H.264 and MPEG-2/4 standards, as well as, coding tree unit (CTU) in HEVC standard. Other standards may use comparable names for the same fundamental block. A size of the BCU may be selected by an encoder as, for example, 16×16, 32×32, 64×64, etc. Each BCU 130 may encode a portion of the image data represented by the frame 124. For example, in some embodiments, a BCU may encode data corresponding to a fixed area of 16×16 pixels, while, in other embodiments, a BCU may encode data corresponding to a dynamic area and/or an area larger or smaller than 16×16 pixels.

In some embodiments, the BCUs in the compressed video data 120 may encode video data so as to reduce temporal and spatial redundancy that exist between or within frames. For example, an intra-predicted BCU or 1-BCU may encode video data based on spatially neighboring samples or previously coded pixel blocks in the same frame, thereby reducing spatial redundancy. In contrast, an inter-predicted BCU may encode video data based on references to one or more coded pixel blocks in previous coded reference frames, thereby reducing temporal redundancy. One example of an inter-predicted BCU may be a predictive BCU or P-BCU, which may be encoded based on references to one or more other past (in a temporal sense) frames. Another example of an inter-predicted BCU may be a bi-predictive or B-BCU, which may be encoded based on references to past and/or future frames. The BCU 130, which may be an inter-predicted BCU, may indicate reference blocks using one or more motion vectors (MVs) 134 and a corresponding reference frame index. In some embodiments, the difference between the video data encoded by BCU 130 and the targeted (in other words, reference) BCU, referred to as the prediction error or residual block, may be encoded using transform coefficients 132. The transform coefficients 132, which may be 2-dimensional discrete trigonometric transform coefficients, may further be quantized and entropy-coded. The reference frame index, quantization, and/or entropy-coding information may be stored in the BCU 130 by the video capture device 110 as other data 136.

After capture and compression by the video capture device 110, the surveillance system 100 may then store the compressed video data 120 in a compressed video data storage system 140. Subsequently, the surveillance system 100 may use an object tracking module 150 to analyze the compressed video data 120 to determine whether foreground motion exists in the compressed video data 120.

In some embodiments, the object tracking module 150 may determine whether foreground motion exists in the compressed video data 120 using features extracted from the compressed video data 120. The features may be spatial or temporal features. The features may also be complementary in nature and describe encoded scene changes in a given BCU. For example, a spatial feature may quantify changes occurring within the same video frame, while a temporal feature may quantify changes occurring between frames. As mentioned above, in compressed video data image transforms based on transform coefficients may be used to reduce spatial redundancy, while motion vectors may be used to reduce temporal redundancy. As a result, the transform coefficients and the motion vectors associated with a BCU may encode incremental changes between successive frames. In some embodiments, the transform coefficients (for example, the transform coefficients 132) and the magnitudes of the motion vectors (for example, the motion vectors 134) associated with a particular BCU may be indicative of object motion in that BCU. Accordingly, the object tracking module 150 may be able to use the transform coefficients and motion vector magnitudes associated with a particular BCU to determine whether that BCU includes foreground or object motion. In some embodiments, the object tracking module 150 may be able to extract the transform coefficients and motion vector magnitudes without having to actually decompress the compressed video data 120. This may speed up and reduce the memory requirement for the foreground motion determination process as compared to a process in which the compressed video data 120 is decompressed before foreground motion determination occurs.

In some embodiments, the object tracking module 150 may be configured to determine a sum of transform coefficient magnitudes, denoted herein as "$x_1$", and a sum of motion vector magnitudes, denoted herein as "$x_2$", for use in determining whether foreground motion exists in a particular BCU. Together, $x_1$ and $x_2$ may form a 2×1 vector $$\vec{F}_{t,idx} = [x_1 x_2]^T, \qquad [1]$$

where t is a frame number that may be determined from a picture order count associated with the compressed video data 120 and idx may be an index representing the location of a BCU within a particular frame. For example, a frame may include M BCUs, and each of the M BCUs may have an associated index idx, where idx=0 may indicate the BCU in the top-left corner of the frame and the index numbering proceeds in a raster scan order associated with the frame.

As mentioned above, a compression module may encode the prediction error associated with a particular BCU using 2-dimensional trigonometric transforms to generate associated transform coefficients. The compression module may then further quantize the transform coefficients according to step sizes based on the coefficient positions in a coefficient block. The compression module may then entropy code the quantized transform coefficients using, for example, variable length coding, binary arithmetic coding, or context-adaptive binary arithmetic coding (CABAC).

To determine $x_1$, the object tracking module 150 may use a statistical relationship between the transform coefficients for a particular BCU and their corresponding quantization step sizes. In some embodiments, the object tracking module 150 may use a total number of bits consumed in coding the quantized transform coefficients and a quantization parameter $QP^C$ of the BCU, where C=Y, Cb, Cr for each color component. In some embodiments, the number of transform coefficients for a particular BCU may correspond to the number of BCU pixels in the spatial domain. Computing $x_1$ using statistical methods may involve relatively few computations, whereas computing $x_1$ directly using transform coefficients from an input bitstream may involve significant computational overhead.

In some embodiments, a compression module may use integer approximations of 2-dimensional trigonometric transforms using only integer operations to generate transform coefficients. The distribution of transform coefficients may be modeled as a zero-mean Laplacian probability density function:

$$f(z) = \frac{1}{2b} e^{(-|z|/b)}, \quad [2]$$

where z may be the value of a given transform coefficient and b may be a parameter that determines the coefficient variance, which may be defined as $2b^2$.

The correlation between the residual pixels of a BCU may be separable in both horizontal and vertical directions. Accordingly, in some embodiments the $(u,v)^{th}$ coefficient variance $\sigma_Y^2(u,v)$ of a given N×N BCU may be expressed as:

$$\sigma_Y^2(u,v) = \sigma_X^2 [AR_X A^T]_{u,u} [AR_X A^T]_{v,v}, \quad [3]$$

where A may be an N×N BCU transformation matrix, $\sigma_X^2$ may be the variance of pixels constituting the BCU, and $[\bullet]_{u,u}$ may represent the $(u,u)^{th}$ component of an argument matrix. In some embodiments, Rx may be a correlation matrix defined as:

$$R_X = \begin{bmatrix} 1 & \rho & \cdots & \rho^{N-1} \\ \rho & 1 & \cdots & \rho^{N-2} \\ \vdots & \vdots & \ddots & \vdots \\ \rho^{N-1} & \rho^{N-2} & \cdots & 1 \end{bmatrix} \quad [4]$$

for the correlation coefficient ρ. For example, supposing ρ is predetermined as 0.6, the variance matrix for a 4×4 BCU may be computed in this situation as:

$$\sigma_Y^2 = \sigma_X^2 \begin{bmatrix} 5.6074 & 2.1252 & 1.0609 & 0.6785 \\ 2.1252 & 0.8055 & 0.4021 & 0.2572 \\ 1.0609 & 0.4021 & 0.2007 & 0.1284 \\ 0.6785 & 0.2572 & 0.1284 & 0.0821 \end{bmatrix} = \sigma_X^2 K \quad [5]$$

and the $(u,v)^{th}$ component of matrix K may then be obtained as:

$$K(u,v) = [AR_X A^T]_{u,u} [AR_X A^T]_{v,v} \quad [6]$$

In some embodiments, the matrix K may be predetermined for other transform types or BCU sizes, using discrete cosine transform (DCT) or discrete sine transform (DST) methods.

In some embodiments, the transform coefficient distribution $f_y(z)$ of an N×N residual block may be expressed as a mixture of Laplacian densities corresponding to each position (u,v) in the coefficient block. Using the substitution $$2b^2 = \sigma_X^2 K(u,v) \quad [7]$$

for individual Laplacians may result in $$f_Y(z) = \quad [8]$$

$$\frac{1}{\sqrt{2}\, N^2 \sigma_X} \sum_{u=0}^{N-1} \sum_{v=0}^{N-1} \frac{1}{\sqrt{K(u,v)}} \exp\left(-\frac{1}{\sigma_X}\sqrt{\frac{2}{K(u,v)}}\,|z|\right)$$

where K(u,v) may correspond to the $(u,v)^{th}$ component of matrix K.

A compression module may quantize transform coefficients of the prediction error. This quantization may reduce the precision of the transform coefficients while increasing the compression of the data. In some embodiments, the compression module may map insignificant coefficient values to zero while retaining a reduced number of significant, no-zero coefficients during the quantization process. Accordingly, the output of the quantization process may be a sparse array of quantized coefficients, which may be represented as:

$$k = \text{round}(z/Q) = \text{sgn}(z)\lfloor (|z|+f)/Q \rfloor,$$

where z may be an input coefficient, k may be the value of the mapped coefficient level for all values of z in the $k^{th}$ quantization interval, Q may be the quantization step size, and f may be a rounding offset parameter. For a given BCU, the values of Q may vary depending on the coefficient position, as mentioned above. Accordingly, the probability $P(z_k|Q,b)$ that a Laplacian distributed coefficient z is mapped to the $k^{th}$ quantization interval may be analytically expressed as:

$$P(z_k|Q,b) = \quad [10]$$

$$\begin{cases} \int_{(kQ-Q+f)}^{(kQ+f)} f(z)\,dz = \frac{1}{2} e^{kQ/b}(e^{Q/b}-1)e^{-(Q-f)/b}; & \text{if } k < 0 \\ \int_{-(Q+f)}^{(Q-f)} f(z)\,dz = 1 - e^{-(Q-f)/b}; & \text{if } k = 0 \\ \int_{(kQ-f)}^{(kQ+Q-f)} f(z)\,dz = \frac{1}{2} e^{-kQ/b}(e^{Q/b}-1)e^{-(Q-f)/b}; & \text{if } k > 0 \end{cases}$$

The object tracking module 150 may statistically estimate the value of $x_1$ for a given N×N block as the normalized sum of transformed coefficient magnitudes $|z_k|$:

$$x_1 = \sum_{k=-\infty}^{\infty} |z_k|^n P(z_k|Q,b)$$

(where n is finite integer, i.e., 1, 2, 3, . . . )

for the simplest case n=1, we have $$x_1 = \sum_{k=-\infty}^{\infty} |z_k| P(z_k | Q, b) \quad [11]$$

$$= \frac{Q}{2}(e^{Q/b} - 1)e^{-(Q-f)/b}\left(\sum_{k=1}^{\infty} ke^{-kQ/b} + \sum_{k=-1}^{-\infty} -ke^{kQ/b}\right)$$

$$= Q(e^{Q/b} - 1)e^{-(Q-f)/b}\sum_{k=1}^{\infty} ke^{-kQ/b}$$

$$= \frac{Qe^{f/b}}{(e^{Q/b} - 1)}$$

In [11], $z_k$ may assume positive as well as negative values, which is why its absolute value $|z_k|$ for n=1 may be considered in the above derivation. Instead of $|z_k|$, taking higher powers of $|z_k|$ such as $|z_k|^2$, $|z_k|^3$, $|z_k|^4$, etc. may also be used, however, at a higher computational cost. There may be multiple transform blocks (of different Q and b) constituting a BCU. Therefore, assuming a total of p transform blocks with sizes $N_1, N_2, \ldots, N_p$ for a given BCU, $x_1$ may be expressed as:

$$\frac{1}{p}\sum_{i=1}^{p}\frac{1}{N_i^2}\sum_{u=0}^{N_1-1}\sum_{v=0}^{N_1-1}Q_i(u,v) \quad [12]$$

$$\exp\left(\frac{f}{\sigma_X\sqrt{K_i(u,v)/2}}\right)\bigg/\left(\exp\left(\frac{Q_i(u,v)}{\sigma_X\sqrt{K_i(u,v)/2}}\right) - 1\right)$$

The object tracking module 150 may obtain parameter $\sigma_x$ needed to evaluate $x_1$ by equating an expression for the number of bits B consumed in coding the quantized transform coefficients of a BCU with its actual value obtained from the input bitstream.

In some embodiments, the number of bits used to encode each quantized coefficient may be given by the entropy measure:

$$H(Q, b) = -\sum_{k=-\infty}^{\infty} P(z_k | Q, b)\log_2(P(z_k | Q, b)) \quad [13]$$

$$= -(1 - e^{-(Q-f)/b})\log_2(1 - e^{-(Q-f)/b}) -$$

$$\frac{e^{-(Q-f)/b}}{\ln 2}\left(\ln\left(\frac{e^{Q/b} - 1}{2}\right) - \frac{Q-f}{b} - \frac{Qe^{Q/b}}{b(e^{Q/b} - 1)}\right)$$

An expression for the total number of bits used to code the quantized transform coefficients of a particular BCU may then be obtained as the sum of entropy measures for each coefficient. The value b may be related to $\sigma_X$ as described above, and the values of Q corresponding to each coefficient may be obtained from quantization parameters $QP^C$ (C=Y, Cb, Cr) of the BCU. For a given transform unit, the relationship between $QP^C$ and Q for the $(u,v)^{th}$ coefficient may be expressed as:

$$Q(u,v) = M(u,v)2^{\lfloor QP^C/6 \rfloor},$$

where M may be the u×v matrix of scalar multipliers. Accordingly, given a total of p transform blocks with sizes $N_1, N_2, \ldots, N_p$, the expression for the bitrate B for a given BCU may be:

$$B = \sum_{i=1}^{p}\sum_{u=0}^{N_1-1}\sum_{v=0}^{N_1-1} H\left(Q_i(u,v), \sigma_X\sqrt{K_i(u,v)/2}\right). \quad [15]$$

In some embodiments, the values of Qi and Ki may be pre-computed for the set of known transform sizes allowed by the video compression standard. For example, the parsing process for bitstreams using CABAC may proceed as a sequence of (context adaptive) binary decoding decisions taken based on the current value of context parameters or variables, which may be updated via binary shift operations with each bit read from the input bitstream. Accordingly, the object tracking module 150 may compute the value of B for a particular BCU as the total number of binary shifts involved during the transform coefficient decoding process of each transform unit. The object tracking module 150 may then determine $\sigma_X$ using numerical techniques, and then use the determined $\sigma_X$ to determine of $x_1$ as described above.

The object tracking module 150 may then compute $x_2$ for a particular BCU as the normalized or weighted sum of motion vector magnitudes associated with the particular BCU. The object tracking module 150 may determine the weight corresponding to each motion vector based on (a) the size of the BCU partition or prediction unit the motion vector represents, and (b) the reference frame index. Each motion vector may have an associated direction $(x_{ij}, y_{ij})$, representing the prediction information of the $i^{th}$ partition in the $j^{th}$ direction (forward/backward), and a reference frame index value $s_{ij}$. The object tracking module 150 may then compute $x_2$ as:

$$x_2 = \sum_{i=1}^{p}\frac{w_i}{d_i}\sum_{j=1}^{d}\left(\sqrt{x_{ij}^2 + y_{ij}^2}\bigg/(s_{ij} + 1)\right) \quad [16]$$

where $d_i$ may be defined as:

$$d_i = \begin{cases} 1; & \text{if } ith \text{ partition is uni-directionally predicted} \\ 2; & \text{otherwise} \end{cases} \quad [17]$$

and $W_i$ may be defined as:

$$W_i = \frac{\text{partition size (in pixels) predicted by the motion vector}}{\text{total } BCU \text{ size (in pixels)}} \quad [18]$$

Figure 2:
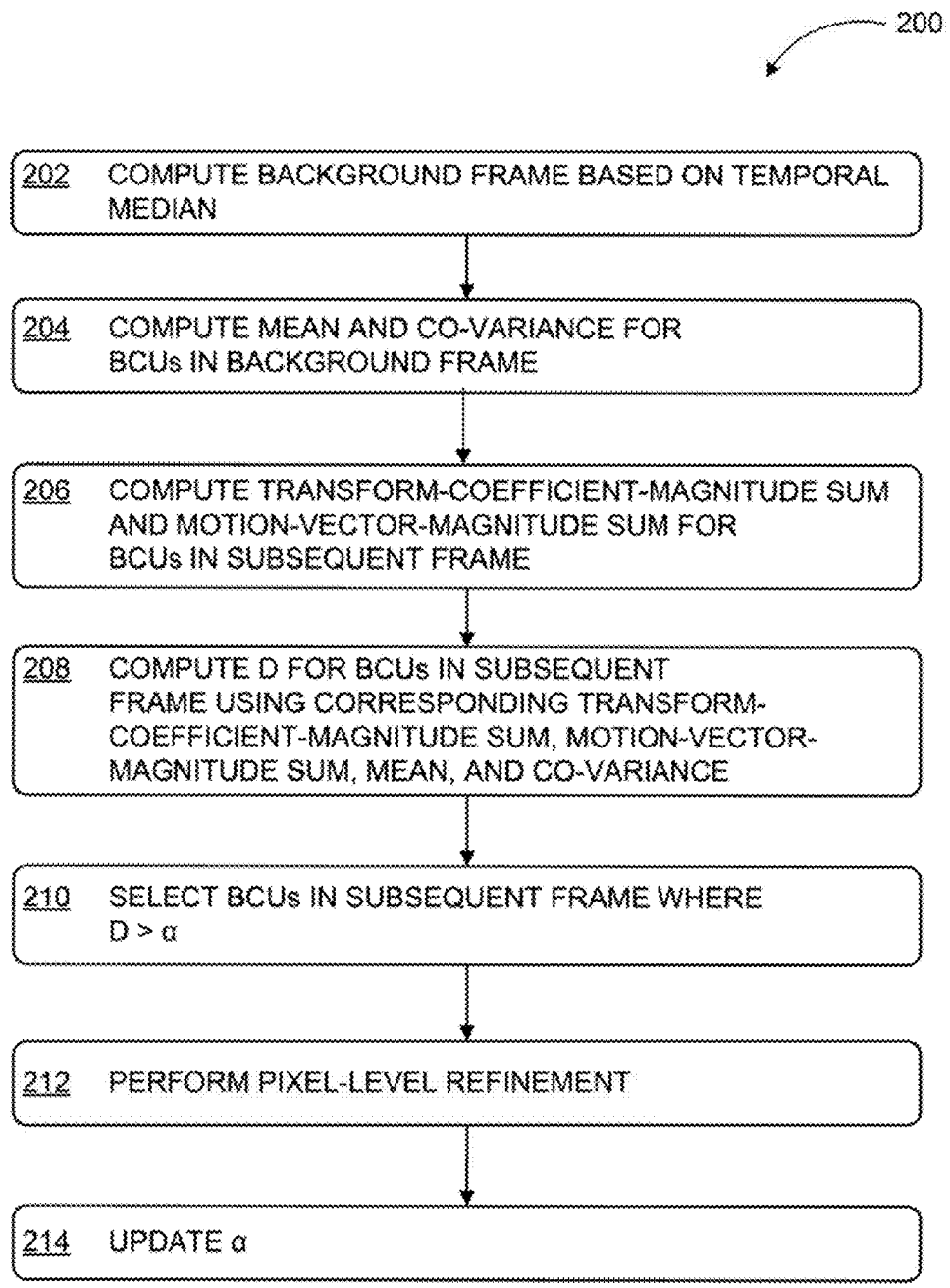
FIG. 2 is a flowchart illustrating an example process to detect foreground motion detection in compressed video data.

FIG. 2 is a flowchart illustrating an example process 200 to detect foreground motion detection in compressed video data, arranged in accordance with at least some embodiments described herein. Process 200 may include one or more operations, functions, or actions as illustrated by one or more of blocks 202-214, and may be performed by a surveillance system such as the surveillance system 100 or a foreground detection module such as the object tracking module 150. Although some of the blocks in process 200 (as well as in any other process/method disclosed herein) are illustrated in a sequential order, these blocks may also be performed in parallel, and/or in a different order than those described herein. Also, the various blocks may be combined into fewer blocks, divided into additional blocks, and/or eliminated based upon the particular implementation. Additional blocks representing other operations, functions, or actions may be provided.

According to process 200, foreground motion detection in compressed video data may begin at block 202 ("Compute background frame based on temporal median"), where the object tracking module may compute a background frame containing a number of background BCUs and based on a temporal median calculated from compressed video training data. In some embodiments, the training data may include frames randomly selected from a number of initial frames from the compressed video data. To improve the recovery of background information from the training data, the object tracking module may use the temporal median to filter out moving objects or foreground motion from the training data frames. In some embodiments, the object tracking module may use other measures of central tendency, such as a temporal mode or temporal mean, instead of or in addition to the temporal median.

At block 204 ("Compute mean and co-variance for BCUs in background frame"), which may follow block 202, the object tracking module may compute background mean and co-variance values based on the transform-coefficient-magnitude and motion-vector-magnitude sums $x_1$ and $x_2$ for each BCU in the background frame. The object tracking module may compute the sums $x_1$ and $x_2$ as described above. In some embodiments, the object tracking module may compute the sums $x_1$ and $x_2$ based on a sliding temporal window including data from a fixed number T most recent frames. Each of the T positions may be assigned a different fixed weight, where data from more recent frames are more heavily weighted than data from less recent frames. Frames in the sliding temporal window may be removed in a first-in-first-out manner such that the window includes only the T most recent frames.

For example, suppose that linearly increasing weight values $w_i = i/T$ are assigned to each position i in a temporal window. The expected values of $x_1$ and $x_2$ may then be computed as:

$$\mu_1 = \overline{x_1} = \sum_{i=max(1,n-T+1)}^{n} w_{T-n+i}(x_1)_i \bigg/ \sum_{i=max(1,n-T+1)}^{n} w_{T-n+i} \quad [19]$$

and $$\mu_2 = \overline{x_2} = \sum_{i=max(1,n-T+1)}^{n} w_{T-n+i}(x_2)_i \bigg/ \sum_{i=max(1,n-T+1)}^{n} w_{T-n+i} \quad [20]$$

respectively. The notation (•), may represent the $i^{th}$ value of its argument expression in temporal history. The value of $\vec{\mu}_{idx}$ may be given as:

$$\vec{\mu}_{idx} = [\mu_1 \mu_2]^T. \quad [21]$$

Similarly, the expected values of $x_1^2$ and $x_2^2$ may be computed as:

$$\overline{x_1^2} = \sum_{i=max(1,n-T+1)}^{n} w_{T-n+i}(x_1^2)_i \bigg/ \sum_{i=max(1,n-T+1)}^{n} w_{T-n+i}, \quad [22]$$

and $$\overline{x_2^2} = \sum_{i=max(1,n-T+1)}^{n} w_{T-n+i}(x_2^2)_i \bigg/ \sum_{i=max(1,n-T+1)}^{n} w_{T-n+i} \quad [23]$$

respectively. If $x_1$ and $x_2$ are statistically uncorrelated, the value of $\Sigma_{idx}$ may be $$\Sigma_{idx} = \begin{bmatrix} \sigma_1^2 & 0 \\ 0 & \sigma_2^2 \end{bmatrix}. \quad [24]$$

where $\sigma_1^2 = \overline{x_1^2} - (\overline{x_1})^2$ and $\sigma_2^2 = \overline{x_2^2} - (\overline{x_2})^2$.

Direct computation of the values of $\vec{\mu}_{idx}$ and $\Sigma_{idx}$ using $\overline{x_1}$, $\overline{x_2}$, $\overline{x_1^2}$, and $\overline{x_2^2}$ following the entry of every new sample in the window may be computationally prohibitive and inefficient, as most of the samples present in the window may remain unaltered between consecutive entries. In order to avoid repetitive computations at run-time, the object tracking module may use a recursive process. The $n^{th}$-step of the recursive process may be given as:

$$\begin{pmatrix} \overline{x_1^a x_2^b} \\ S_{x_1^a x_2^b} \\ S_w \end{pmatrix}_n = \begin{cases} \begin{pmatrix} (x_1^a x_2^b)_1 \\ (x_1^a x_2^b)_1 \\ 1 \end{pmatrix}; & \text{if } n = 1 \\ \begin{pmatrix} \frac{\overline{x_1^a x_2^b} S_w - (S_{x_1^a x_2^b}/T) + (x_1^a x_2^b)_n}{S_w + w_{T-n+1}} \\ S_{x_1^a x_2^b} + (x_1^a x_2^b)_n \\ S_w + w_{T-n+1} \end{pmatrix}_{n-1}; & \text{if } 1 < n \leq T \\ \begin{pmatrix} \frac{\overline{x_1^a x_2^b} S_w - (S_{x_1^a x_2^b}/T) + (x_1^a x_2^b)_n}{S_w} \\ S_{x_1^a x_2^b} - (x_1^a x_2^b)_{n-T} + (x_1^a x_2^b)_n \\ S_w \end{pmatrix}_{n-1}; & \text{if } n > T. \end{cases} \quad [25]$$

where ordered pair (a,b) may be selected from one of (1,0), (0,1), (2,0), and (0,2). The values of $\overline{x_1}$, $\overline{x_2}$, $\overline{x_1^2}$, and $\overline{x_2^2}$ for computing the values of $\vec{\mu}_{idx}$ and $\Sigma_{idx}$ following the $n^{th}$ sample entry may be obtained by running separate recursive processes with the ordered pair (a,b) substituted by (1.0), (0,1), (2,0), and (0,2) respectively.

At block 206 ("Compute transform-coefficient-magnitude sum and motion-vector-magnitude sum for BCUs in subsequent frame"), which may follow block 204, the object tracking module may compute a transform-coefficient-magnitude sum $x_1$ and a motion-vector-magnitude sum $x_2$ for one or more BCUs in a subsequent frame, as described above. The subsequent frame may be immediately after the background frames used to compute mean and co-variance in block 204 or may be separated from the background frames by one or more additional frames.

At block 208 ("Compute D for BCUs in subsequent frame using corresponding transform-coefficient-magnitude sum, motion-vector-magnitude sum, mean, and co-variance"), which may follow block 206, the object tracking module may compute a statistic D for each BCU in the subsequent frame:

$$D = \sqrt{(\vec{F}_{t,idx} - \vec{\mu}_{idx})^T \Sigma_{idx}^{-1} (\vec{F}_{t,idx} - \vec{\mu}_{idx})} \quad [26]$$

The statistic D may be known as a "Mahalanobis distance", and may be indicative of a distance between the BCU vector $\vec{F}_{t,idx}$ and the mean $\vec{\mu}_{idx}$, measured in units of $|\Sigma_{idx}|$. In some embodiments, the statistic D may represent the degree to which a particular BCU has motion or activity exceeding that of the background.

At block 210 ("Select BCUs in subsequent frame where D>α"), which may follow block 208, the object tracking module may then compare the computed statistic D for each BCU in the subsequent frame to an adaptive threshold α, which may represent a threshold of similarity to a co-located BCU in the background frame. The object tracking module may consider BCUs where D exceeds α as potentially including object motion or activity and BCUs where D does not exceed α as not including object motion or activity. Accordingly, the object tracking module may be able to filter out or suppress the contribution of background motion to the foreground motion detection process. This may correspond to a process in which the object tracking module attempts to fit a bivariate normal distribution $\mathcal{N}$ corresponding to each BCU location idx in the $x_1$-$x_2$ feature space. In some embodiments, the object tracking module may select the adaptive threshold α using a 99% confidence interval for background model prediction as:

$$\int_{\mu_2-\alpha\sigma_2}^{\mu_2+\alpha\sigma_2}\int_{\mu_1-\alpha\sigma_1}^{\mu_1+\alpha\sigma_1} N(\vec{\mu}_{idx}, \Sigma_{idx}) dx_1 dx_2 = \text{erf}^2\left(\frac{\alpha}{\sqrt{2}}\right) = 0.99 \qquad [27]$$

The object tracking module may use the BCUs where D does not exceed α to update the values for background mean $\vec{\mu}_{idx}$ and co-variance $\Sigma_{idx}$. In some embodiments, the object tracking module may update $\vec{\mu}_{idx}$ and $\Sigma_{idx}$ using the recursive process described above.

At block 212 ("Perform pixel-level refinement"), which may follow block 210, the object tracking module may attempt to perform pixel-level refinement on the BCUs determined to potentially include object motion by eliminating pixels that are similar to co-located pixels in the background frame. In some embodiments, the object tracking module may determine whether pixels in the BCUs are similar to co-located background pixels using luminance and/or chrominance comparisons. For example, suppose that a first pixel from the current frame has YCbCr color coordinates $X_F \equiv (Y_F, Cb_F, Cr_F)$ and a second, co-located pixel from the background frame has color coordinates $X_B \equiv (Y_B, Cb_B, Cr_B)$. The object tracking module may first determine a luminance differential $\Delta Y = |Y_F - Y_B|$ and a chrominance differential $\Delta C = |Cb_F - Cb_B| + |Cr_F - Cr_B|$ based on the pixel color coordinates. The object tracking module may then compare the $\Delta Y$ and the $\Delta C$ to respective decision thresholds $t_Y = C_1 + C_2|\Sigma_{idx}|$ and $t_C = C_3 + C_4|\Sigma_{idx}|$, respectively, where $C_1$, $C_2$, $C_3$, and $C_4$ are pre-determined constants. If $\Delta Y > t_Y$ and $\Delta C > t_C$, the object tracking module may determine that (a) the first and second pixels are different, and (b) the first pixel is part of the foreground.

In some embodiments, the object tracking module may update the background frame using pixels in any BCUs that were not determined to include object motion. For example, suppose $C_t$ and $I_t$ denote the current frame at time t and the corresponding background frame respectively. The object tracking module may then use pixels in $C_t$ corresponding to those BCUs that were not determined to include object motion to update current background $I_t$ to $I_{t+1}$ as:

$$I_{t+1}(x,y) = \beta C_t(x,y) + (1-\beta)I_t(x,y), \text{ for } t > k$$

where β is between 0 and 1 and may be a fixed learning rate that determines the tradeoff between stability and quick update of the background frame.

At block 214 ("Update α"), which may follow block 212, the object tracking module may update the adaptive threshold α based on the current frame. In some embodiments, the object tracking module may update the adaptive threshold α according to:

$$\alpha = \sqrt{2}\text{erf}^{-1}(\sqrt{L+(0.99-L)V/N^2}), \qquad [29]$$

where V may be the number of pixels classified as foreground in a BCU, N may represent the size of the BCU, and L may represent the confidence corresponding to V=0 (that is, no pixels in the BCU are foreground pixels).

Figure 3:
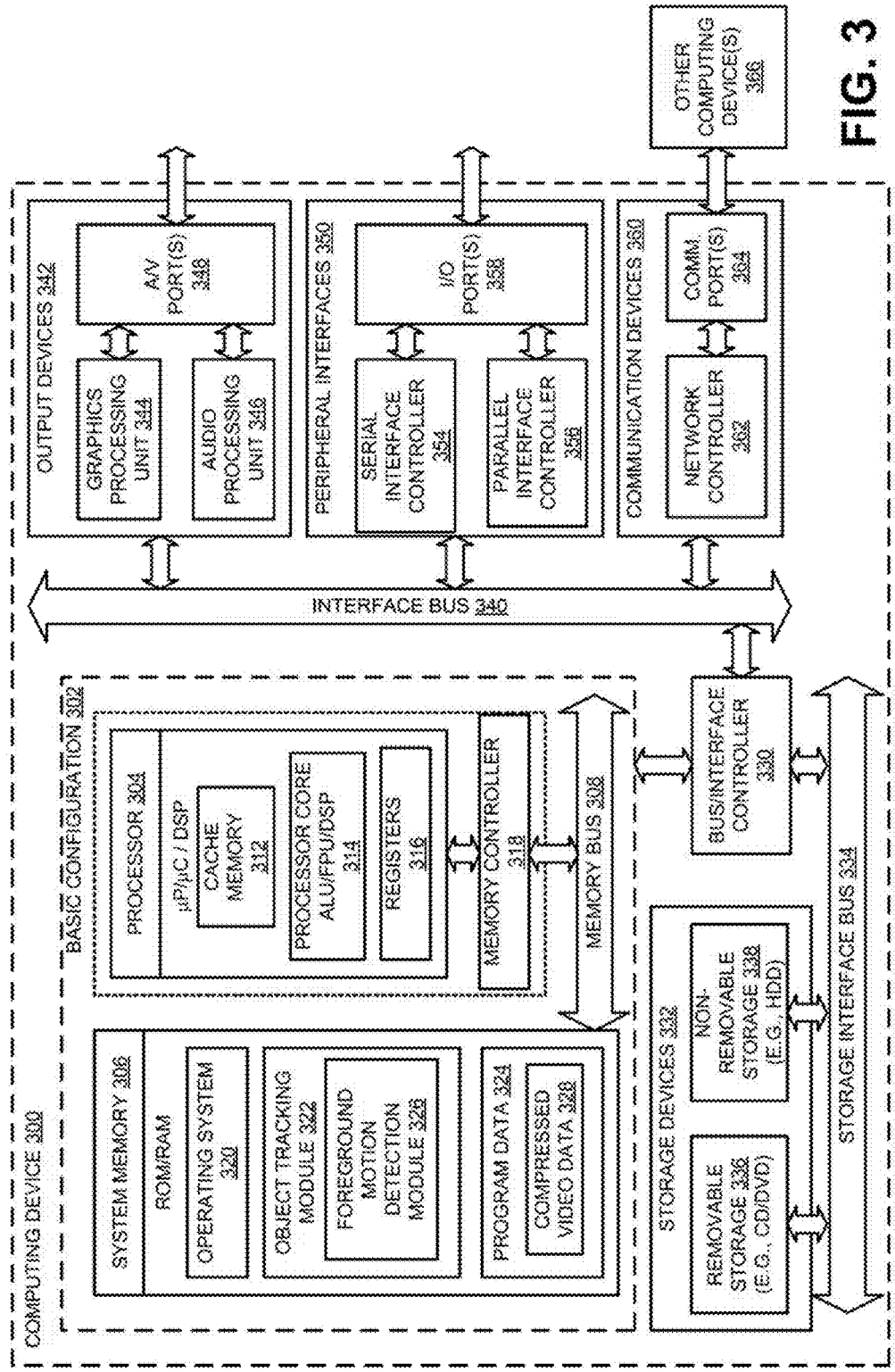
FIG. 3 illustrates a general purpose computing device, which may be used to provide identification of foreground motion detection in compressed video data.

FIG. 3 illustrates a general purpose computing device 300, which may be used to provide identification of foreground motion detection in compressed video data, arranged in accordance with at least some embodiments described herein.

For example, the computing device 300 may be used to identify foreground motion detection in compressed video data as described herein. In an example basic configuration 302, the computing device 300 may include one or more processors 304 and a system memory 306. A memory bus 308 may be used to communicate between the processor 304 and the system memory 306. The basic configuration 302 is illustrated in FIG. 3 by those components within the inner dashed line.

Depending on the desired configuration, the processor 304 may be of any type, including but not limited to a microprocessor (μP), a microcontroller (μC), a digital signal processor (DSP), or any combination thereof. The processor 304 may include one or more levels of caching, such as a cache memory 312, a processor core 314, and registers 316. The example processor core 314 may include an arithmetic logic unit (ALU), a floating point unit (FPU), a digital signal processing core (DSP Core), or any combination thereof. An example memory controller 318 may also be used with the processor 304, or in some implementations, the memory controller 318 may be an internal part of the processor 304.

Depending on the desired configuration, the system memory 306 may be of any type including but not limited to volatile memory (such as RAM), non-volatile memory (such as ROM, flash memory, etc.) or any combination thereof. The system memory 306 may include an operating system 320, an object tracking module 322, and program data 324. The object tracking module 322 may include a foreground motion detection module 326 to implement identification of foreground motion detection in compressed video data as described herein. The program data 324 may include, among other data, compressed video data 328 or the like, as described herein.

The computing device 300 may have additional features or functionality, and additional interfaces to facilitate communications between the basic configuration 302 and any desired devices and interfaces. For example, a bus/interface controller 330 may be used to facilitate communications between the basic configuration 302 and one or more data storage devices 332 via a storage interface bus 334. The data storage devices 332 may be one or more removable storage devices 336, one or more non-removable storage devices 338, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 306, the removable storage devices 336 and the non-removable storage devices 338 are examples of computer storage media. Computer storage media includes, but is not limited to, RAM, ROM, EEPROM, flash memory or other memory technology, CD-ROM, digital versatile disks (DVD), solid state drives (SSD), or other optical storage, magnetic cassettes, magnetic tape, magnetic disk storage or other magnetic storage devices, or any other medium which may be used to store the desired information and which may be accessed by the computing device 300. Any such computer storage media may be part of the computing device 300.

The computing device 300 may also include an interface bus 340 for facilitating communication from various interface devices (e.g., one or more output devices 342, one or more peripheral interfaces 350, and one or more communication devices 360) to the basic configuration 302 via the bus/interface controller 330. Some of the example output devices 342 include a graphics processing unit 344 and an audio processing unit 346, which may be configured to communicate to various external devices such as a display or speakers via one or more A/V ports 348. One or more example peripheral interfaces 350 may include a serial interface controller 354 or a parallel interface controller 356, which may be configured to communicate with external devices such as input devices (e.g., keyboard, mouse, pen, voice input device, touch input device, etc.) or other peripheral devices (e.g., printer, scanner, etc.) via one or more I/O ports 358. An example communication device 360 includes a network controller 362, which may be arranged to facilitate communications with one or more other computing devices 366 over a network communication link via one or more communication ports 364. The one or more other computing devices 366 may include servers at a datacenter, customer equipment, and comparable devices.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 300 may be implemented as a part of a general purpose or specialized server, mainframe, or similar computer that includes any of the above functions. The computing device 300 may also be implemented as a personal computer including both laptop computer and non-laptop computer configurations.

Figure 4:
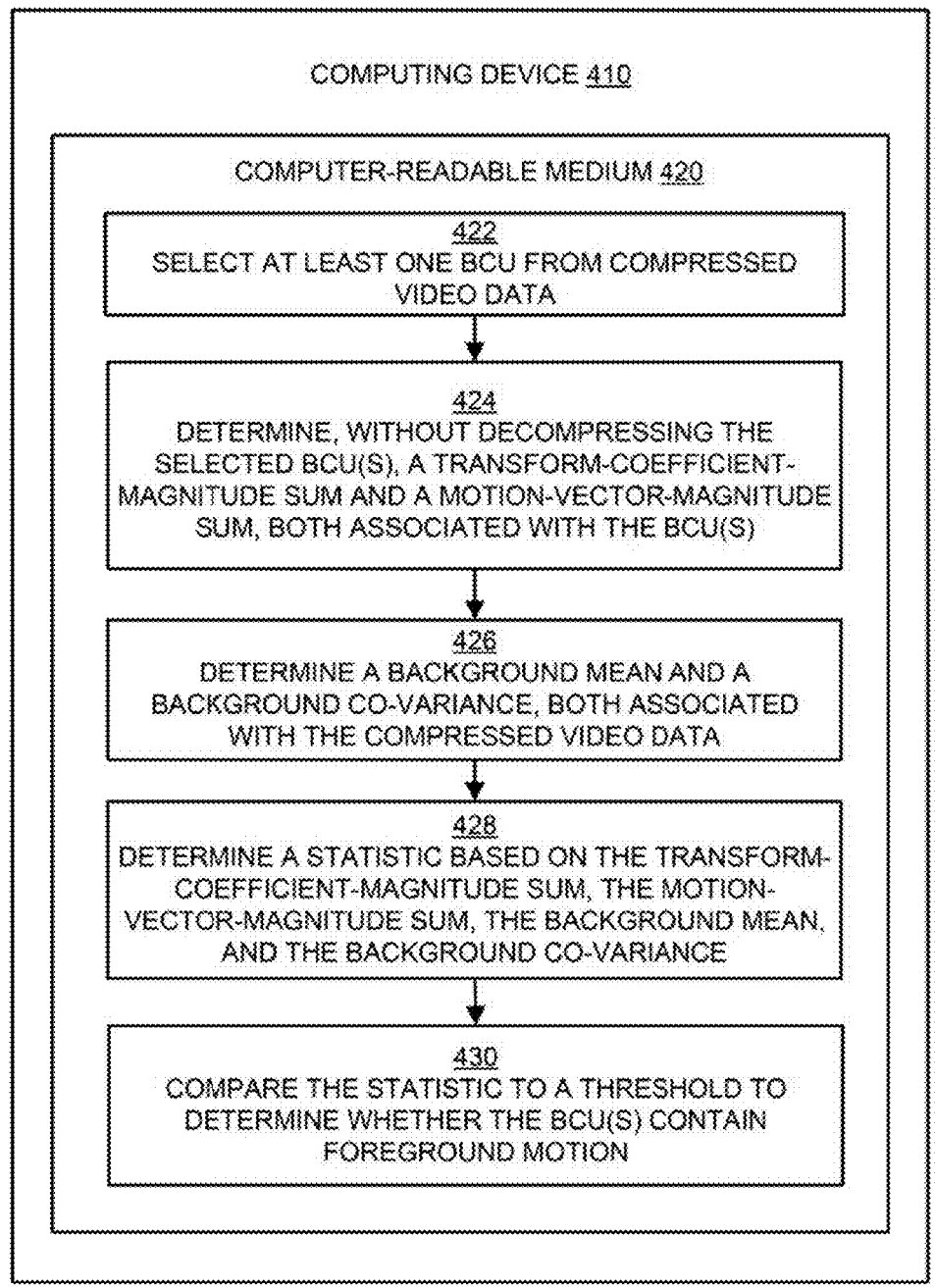
FIG. 4 is a flow diagram illustrating an example method to identity foreground motion detection in compressed video data that may be performed by a computing device such as the computing device in FIG. 3.

FIG. 4 is a flow diagram illustrating an example method to identify foreground motion detection in compressed video data that may be performed by a computing device such as the computing device in FIG. 3, arranged in accordance with at least some embodiments described herein.

Example methods may include one or more operations, functions or actions as illustrated by one or more of blocks 422, 424, 426, 428, and/or 430, and may in some embodiments be performed by a computing device such as the computing device 300 in FIG. 3. The operations described in the blocks 422-430 may also be stored as computer-executable instructions in a computer-readable medium such as a computer-readable medium 420 of a computing device 410.

An example process to identify foreground motion detection in compressed video data may begin with block 422, "SELECT AT LEAST ONE BCU FROM COMPRESSED VIDEO DATA", where an object tracking module such as the object tracking module 150 or 322 may select one or more BCUs from a frame in compressed video data, as described above.

Block 422 may be followed by block 424, "DETERMINE, WITHOUT DECOMPRESSING THE SELECTED BCU(S), A TRANSFORM-COEFFICIENT-MAGNITUDE SUM AND A MOTION-VECTOR-MAGNITUDE SUM, BOTH ASSOCIATED WITH THE BCU(S)", where the object tracking module may determine a transform-coefficient-magnitude sum (for example, "$x_1$" as described above in FIG. 1) and a motion-vector-magnitude sum (for example, "$x_2$" as described above in FIG. 1) associated with the BCU(s) without decompressing the BCU(s). In some embodiments, the object tracking module may be configured to determine the transform-coefficient-magnitude sum based on a statistical relationship between the transform coefficients associated with the BCU(s) and one or more quantization step sizes associated with the transform coefficients, as described above. In some embodiments, the object tracking module may be configured to determine the motion-vector-magnitude sum by weighting different motion vectors based on motion vector directions, the sizes of the BCU partitions, and/or reference frame index values, as described above.

Block 424 may be followed by block 426, "DETERMINE A BACKGROUND MEAN AND A BACKGROUND CO-VARIANCE, BOTH ASSOCIATED WITH THE COMPRESSED) VIDEO DATA", where the object tracking module may use the transform-coefficient-magnitude and motion-vector-magnitude sums associated with one or more background frames to determine a background mean and a background co-variance, as described above. In some embodiments, the object tracking module may determine the background mean and co-variance based on a sliding temporal window with differently-weighted positions. The object tracking module may also be configured to update the background mean and co-variance using a recursive process, as described above.

Block 426 may be followed by block 428, "DETERMINE A STATISTIC BASED ON THE TRANSFORM-COEFFICIENT-MAGNITUDE SUM, THE MOTION-VECTOR-MAGNITUDE SUM, THE BACKGROUND MEAN, AND THE BACKGROUND CO-VARIANCE", where the object tracking module may compute a statistic indicative of a distance between the background mean and a BCU vector containing the transform-coefficient-magnitude sum and the motion-vector-magnitude sum. In some embodiments, the statistic may be measured in units of background co-variance, as described above.

Block 428 may be followed by block 430, "COMPARE THE STATISTIC TO A THRESHOLD TO DETERMINE WHETHER THE BCU(S) CONTAIN FOREGROUND MOTION", where the object tracking module may compare the statistic determined in block 428 with an adaptive threshold to determine whether the BCU(s) contain foreground motion or object activity, as described above. In some embodiments, the object tracking module may determine that the BCU(s) contain foreground motion when the statistic exceeds the adaptive threshold, and may determine that the BCU(s) do not contain foreground motion when the statistic does not exceed the adaptive threshold.

FIG. 5 illustrates a block diagram of an example computer program product, arranged in accordance with at least some embodiments described herein.

In some examples, as shown in FIG. 5, a computer program product 500 may include a signal bearing medium 502 that may also include one or more machine readable instructions 504 that, when executed by, for example, a processor may provide the functionality described herein. Thus, for example, referring to the processor 304 in FIG. 3, the object tracking module 322 may undertake one or more of the tasks shown in FIG. 5 in response to the instructions 504 conveyed to the processor 304 by the signal bearing medium 502 to perform actions associated with identifying foreground motion detection in compressed video data as described herein. Some of those instructions may include, for example, instructions to select at least one BCU from compressed video data, determine, without decompressing the selected BCU(s), a transform-coefficient-magnitude sum and a motion-vector magnitude sum, both associated with the BCU(s), determine a background mean and a background co-variance, both associated with the compressed video data, determine a statistic based on the transform-coefficient-magnitude sum, the motion-vector-magnitude sum, the background mean, and the background co-variance, and/or compare the statistic to a threshold to determine whether the BCU(s) contain foreground motion, according to some embodiments described herein.

In some implementations, the signal bearing medium 502 depicted in FIG. 5 may encompass computer-readable medium 506, such as, but not limited to, a hard disk drive (HDD), a solid state drive (SSD), a compact disc (CD), a digital versatile disk (DV)), a digital tape, memory, etc. In some implementations, the signal bearing medium 502 may encompass recordable medium 508, such as, but not limited to, memory, read/write (R/W) CDs, R/W DVDs, etc. In some implementations, the signal bearing medium 502 may encompass communications medium 510, such as, but not limited to, a digital and/or an analog communication medium (e.g., a fiber optic cable, a waveguide, a wired communication link, a wireless communication link, etc.). Thus, for example, the computer program product 500 may be conveyed to one or more modules of the processor 304 by an RF signal bearing medium, where the signal bearing medium 502 is conveyed by the wireless communications medium 510 (e.g., a wireless communications medium conforming with the IEEE 802.11 standard).

According to some examples, a system is provided to distinguish foreground motion from background motion in video data. The system may include a memory configured to store compressed video data and a processor block. The processor block may be configured to select, from the compressed video data, a BCU that potentially contains foreground motion. The processor block may be further configured to determine, without decompression of the BCU, a statistic based on a transform-coefficient-magnitude sum of the BCU, a motion-vector-magnitude sum of the BCU, a background mean associated with the compressed video data, and/or a background co-variance associated with the compressed video data. The processor block may be further configured to determine, based on a comparison of the statistic to a threshold, whether the BCU contains the foreground motion.

According to some embodiments, the processor block may be configured to determine the transform-coefficient-magnitude sum based on at least one quantized transform coefficient of the BCU, at least one corresponding quantization step size, and/or a number of bits consumed in coding the at least one quantized transform coefficient. The processor block may be configured to determine the motion-vector-magnitude sum based on at least one BCU partition/prediction unit associated with a motion vector of the BCU and a reference frame index associated with the motion vector. In some embodiments, the processor block may be configured to compute a Mahalanobis distance between the statistic and the background mean to determine whether the BCU contains foreground motion.

According to other embodiments, the processor block may be further configured to determine whether a BCU pixel is similar to a co-located pixel in a background frame and determine that the BCU pixel is a background pixel in response to determination that the BCU pixel is similar to the co-located pixel. The processor block may be further configured to update the threshold based on a confidence interval and/or a number of foreground pixels.

According to further embodiments, the processor block may be further configured to generate a temporal median based on a subset of the compressed video data and generate the background mean and the background co-variance based on the temporal median. The processor block may be further configured to generate the background mean and the background co-variance based on a sliding temporal window with varying weights and/or based on a recursive process.

According to other examples, a method is provided to identify foreground motion detection in compressed video data. The method may include selecting at least one BCU from the compressed video data and determining a transform-coefficient-magnitude sum of the at least one BCU and a motion-vector magnitude sum of the at least one BCU without decompressing the at least one BCU. The method may further include determining a statistic based on the transform-coefficient-magnitude sum and the motion-vector-magnitude sum and comparing the statistic to a threshold. The method may further include determining that the at least one BCU contains the foreground motion in response to determination that the statistic is above the threshold and determining that the at least one BCU does not contain foreground motion in response to determination that the statistic is below the threshold.

According to some embodiments, the method may further include determining the transform-coefficient-magnitude sum based on a quantized transform coefficient of the at least one BCU, a quantization step size corresponding to the quantized transform coefficient, and/or a number of bits consumed in coding the at least one quantized transform coefficient. The method may further include determining the motion-vector-magnitude sum based on at least one BCU partition/prediction unit associated with a motion vector of the at least one BCU and a reference frame index associated with the motion vector.

According to other embodiments, comparing the statistic to the threshold may include computing a Mahalanobis distance between the statistic and a background mean and comparing the Mahalanobis distance to the threshold. The method may further include determining whether a first pixel in the at least one BCU is similar to a co-located second pixel in a background frame in response to determination that the at least one BCU contains foreground motion, and determining that the first pixel is a background pixel in response to determination that the first pixel is similar to the second pixel. Determining whether the first pixel is similar to the second pixel may include comparing a luminance and/or a chrominance of the first pixel to the second pixel.

According to further embodiments, the method may further include updating the threshold based on a confidence interval and/or a number of foreground pixels. The method may further include generating a background mean and a background co-variance based on a sliding temporal window with varying weights, where determining the statistic may further include determining the statistic based on the background mean and the background co-variance. In some embodiments, the method may further include generating a temporal median based on a subset of the compressed video data and generating the background mean and the background co-variance based on the temporal median and/or using a recursive process.

According to further examples, a system is provided to identify foreground motion detection in compressed video data. The system may include a memory configured to store compressed video data and a processor block configured to select a BCU that potentially contains foreground motion from the compressed video data. The processor block may be further configured to determine a transform-coefficient-magnitude sum of the BCU and a motion-vector-magnitude sum of the BCU without decompression of the BCU and determine that the BCU contains foreground motion based on the transform-coefficient-magnitude sum and the motion-vector-magnitude sum.

According to some embodiments, the processor block may be further configured to determine the transform-coefficient-magnitude sum based on a quantized transform coefficient of the BCU, a quantization step size corresponding to the quantized transform coefficient, and/or a number of bits consumed in coding the at least one quantized transform coefficient. The processor block may be further configured to determine the motion-vector-magnitude sum based on at least one BCU partition/prediction unit associated with a motion vector of the at least one BCU and a reference frame index associated with the motion vector.

According to other embodiments, the processor block may be further configured to compute a Mahalanobis distance between a background mean and a combination of the transform-coefficient-magnitude sum and the motion-vector-magnitude sum and determine that the BCU contains foreground motion based on the Mahalanobis distance. The processor block may be further configured to determine whether a first pixel in the BCU is similar to a co-located second pixel in a background frame and determine that the first pixel is a background pixel in response to determination that the first pixel is similar to the second pixel. The processor block may be configured to compare a luminance and/or a chrominance of the first pixel to the second pixel to determine whether the first pixel is similar to the second pixel.

According to further embodiments, the processor block may be further configured to generate a background mean and a background co-variance based on a sliding temporal window with varying weights and compare the background mean and the background co-variance to the transform-coefficient-magnitude sum and the motion-vector-magnitude sum to determine that the BCU contains foreground motion. The processor block may be further configured to generate a temporal median based on a subset of the compressed video data and generate the background mean and the background co-variance based on the temporal median. In some embodiments, the processor block may be further configured to use a recursive process to generate the background mean and the background co-variance.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via application specific integrated circuits (ASICs), field programmable gate arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs executing on one or more computers (e.g., as one or more programs executing on one or more computer systems), as one or more programs executing on one or more processors (e.g., as one or more programs executing on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disc (CD), a digital versatile disk (DVD), a digital tape, a computer memory, a solid state drive, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors to move and/or adjust components and/or quantities).

A data processing system may be implemented utilizing any suitable commercially available components, such as those found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system to distinguish foreground motion from background motion in video data, the system comprising:
   a memory configured to store compressed video data; and
   a processor block configured to:
      select, from the compressed video data, a block coding unit (BCU) that potentially includes the foreground motion;
      determine, without decompression of the BCU, a statistic based on one or more of:
         a transform-coefficient-magnitude sum of the BCU,
         a motion-vector-magnitude sum of the BCU,
         a background mean associated with the compressed video data, and
         a background co-variance associated with the compressed video data; and
      determine, based on a comparison of the statistic to a threshold, whether the BCU includes the foreground motion.

2. The system of claim 1, wherein the processor block is further configured to determine the transform-coefficient-magnitude sum based on: at least one quantized transform coefficient of the BCU; and at least one corresponding quantization step size.

3. The system of claim 2, wherein the processor block is further configured to determine the transform-coefficient-magnitude sum based on a number of bits consumed in coding the at least one quantized transform coefficient of the BCU.

4. The system of claim 1, wherein the processor block is further configured to determine the motion-vector-magnitude sum based on:
   at least one BCU partition/prediction unit associated with a motion vector of the BCU; and
   a reference frame index associated with the motion vector of the BCU.

5. The system of claim 1, wherein the processor block is further configured to compute a Mahalanobis distance between the statistic and the background mean to determine whether the BCU includes the foreground motion.

6. The system of claim 1, wherein the processor block is further configured to:
   determine whether a BCU pixel is similar to a co-located pixel in a background frame; and
   in response to the determination that the BCU pixel is similar to the co-located pixel, determine that the BCU pixel is a background pixel.

7. The system of claim 1, wherein the processor block is further configured to update the threshold based on at least one of a confidence interval and a number of foreground pixels.

8. The system of claim 1, wherein the processor block is further configured to:
   generate a temporal median based on a subset of the compressed video data; and
   generate the background mean and the background co-variance based on the temporal median.

9. A method to identify foreground motion in compressed video data, the method comprising:
   selecting, from the compressed video data, at least one block coding unit (BCU);
   determining, without decompressing the at least one BCU: a transform-coefficient-magnitude sum of the at least one BCU, and a motion-vector-magnitude sum of the at least one BCU;
   generating a background mean and a background co-variance based on a sliding temporal window with varying weights;
   determining a statistic based on the transform-coefficient-magnitude sum, the motion-vector-magnitude sum, the background mean, and the background co-variance;
   comparing the statistic to a threshold;
   in response to a determination that the statistic is above the threshold, determining that the at least one BCU includes the foreground motion; and
   in response to a determination that the statistic is below the threshold, determining that the at least one BCU does not include the foreground motion.

10. The method of claim 9, wherein determining the transform-coefficient-magnitude sum is based on at least one of:
   a quantized transform coefficient of the at least one BCU;
   a quantization step size corresponding to the quantized transform coefficient; and
   a number of bits consumed in coding the quantized transform coefficient.

11. The method of claim 9, wherein determining the motion-vector-magnitude sum is based on:
   at least one BCU partition/prediction unit associated with a motion vector of the at least one BCU; and
   a reference frame index associated with the motion vector.

12. The method of claim 9, further comprising:
   in response to the determination that the at least one BCU includes the foreground motion, determining whether a first pixel in the at least one BCU is similar to a co-located second pixel in a background frame; and
   in response to the determination that the first pixel is similar to the co-located second pixel, determining that the first pixel is a background pixel.

13. The method of claim 9, further comprising:
   generating a temporal median based on a subset of the compressed video data; and
   generating the background mean and the background co-variance based on the temporal median.

14. The method of claim 9, wherein generating the background mean and the background co-variance further comprises generating the background mean and the background co-variance using a recursive process.

15. A system to identify foreground motion in video data, the system comprising:
   a memory configured to store compressed video data; and
   a processor block configured to:
      select, from the compressed video data, a block coding unit (BCU) that potentially includes the foreground motion;
      determine, without decompression of the BCU: a transform-coefficient-magnitude sum of the BCU, and a motion-vector-magnitude sum of the BCU;
      generate a background mean and a background co-variance based on a sliding temporal window with varying weights;
      compare the background mean and the background co-variance to the transform-coefficient-magnitude sum of the BCU and the motion-vector-magnitude sum of the BCU;
      determine, based on the background mean, the background co-variance, the transform-coefficient-magnitude sum, and the motion-vector-magnitude sum, that the BCU includes the foreground motion.

16. The system of claim 15, wherein the processor block is further configured to determine the motion-vector-magnitude sum of the BCU based on:

at least one BCU partition/prediction unit associated with a motion vector of the BCU; and a reference frame index associated with the motion vector.

17. The system of claim 15, wherein the processor block is further configured to:

compute a Mahalanobis distance between the background mean and a combination of the transform-coefficient-magnitude sum of the BCU and the motion-vector-magnitude sum of the BCU; and determine that the BCU includes the foreground motion based on the Mahalanobis distance.

18. The system of claim 15, wherein the processor block is further configured to:

determine whether a first pixel in the BCU is similar to a co-located second pixel in a background frame; and in response to the determination that the first pixel is similar to the co-located second pixel, determine that the first pixel is a background pixel.

\* \* \* \* \*

UNITED STATES PATENT AND TRADEMARK OFFICE
CERTIFICATE OF CORRECTION

PATENT NO. : 9,712,828 B2
APPLICATION NO. : 14/807853
DATED : July 18, 2017
INVENTOR(S) : Dey et al.

Page 1 of 1

It is certified that error appears in the above-identified patent and that said Letters Patent is hereby corrected as shown below:

In the Specification

In Column 2, Line 36, delete "implemented:" and insert -- implemented; --, therefor.

In Column 2, Line 44, delete "identity" and insert -- identify --, therefor.

In Column 14, Lines 42-43, delete "COMPRESSED) VIDEO" and insert -- COMPRESSED VIDEO" --, therefor.

In Column 15, Line 41, delete "(DV))," and insert -- (DVD), --, therefor.

Signed and Sealed this
Thirty-first Day of October, 2017

Joseph Matal
*Performing the Functions and Duties of the
Under Secretary of Commerce for Intellectual Property and
Director of the United States Patent and Trademark Office*